Patented Feb. 28, 1933

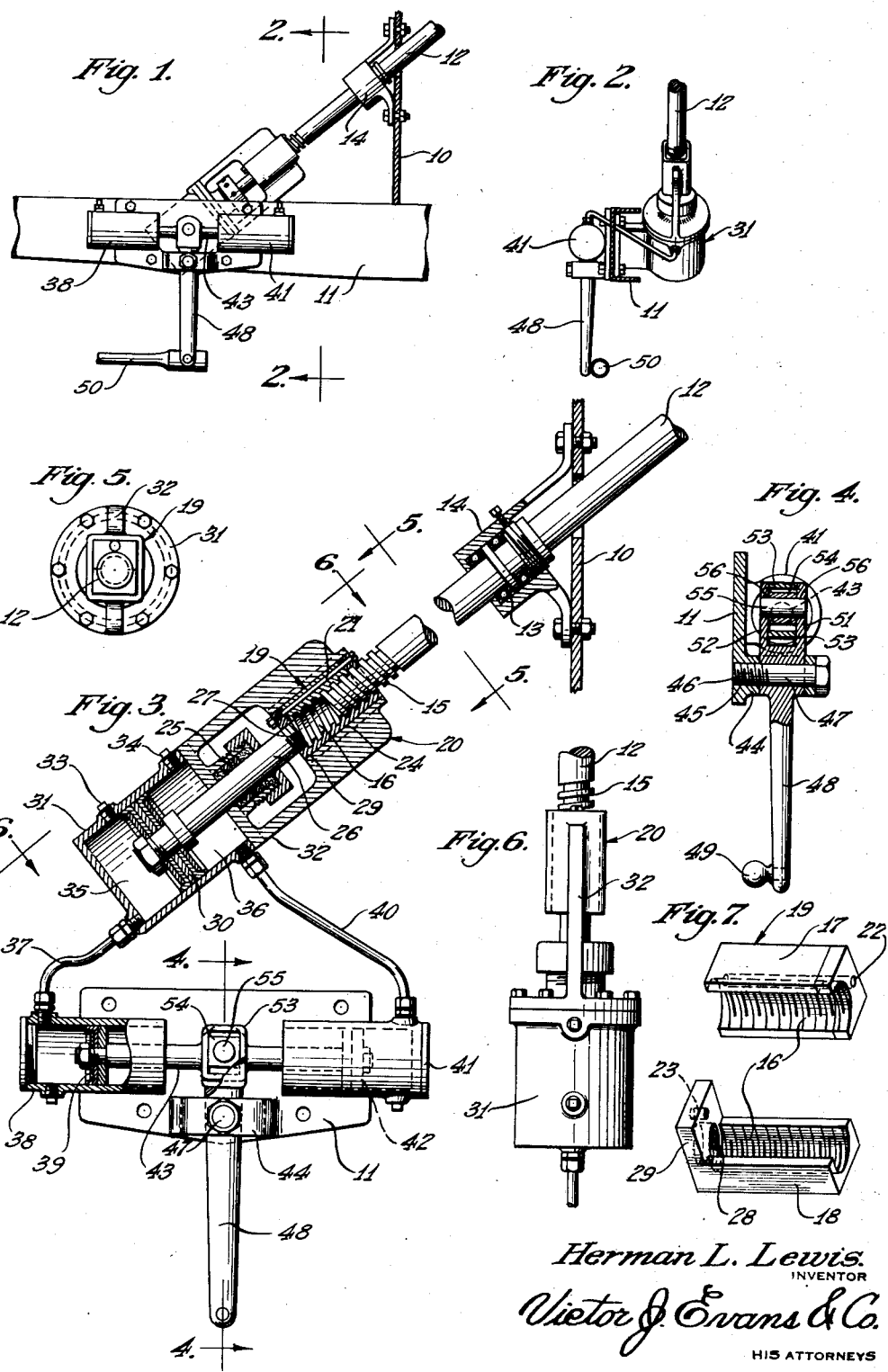

1,899,814

UNITED STATES PATENT OFFICE

HERMAN L. LEWIS, OF DON MARTIN, MEXICO

HYDRAULIC STEERING MECHANISM

Application filed September 22, 1931. Serial No. 564,427.

This invention relates to certain novel improvements in hydraulic steering mechanism, and has for its principal object the provision of an improved construction of this character which will be highly efficient in use and economical in manufacture.

It is an object of this invention to provide an efficient and simplified hydraulic vehicle steering mechanism.

It is another object of the invention to provide an improved mechanism for translating rotative movement of the steering shaft into sliding movement of the fluid pressure operated pistons.

Another object is to provide a device that may readily be installed in many types of automotive vehicles.

Other objects will appear hereinafter.

The invention consists in the novel combination and arrangements of parts to be hereinafter described and claimed.

The invention will be best understood by reference to the accompanying drawing showing the preferred form of construction, and in which:

Fig. 1 is a side elevation of a preferred form of construction of the invention;

Fig. 2 is a front elevational view, on line 2—2 in Fig. 1;

Fig. 3 is a sectional view, partly in elevation of the invention as shown in Figs. 1 and 2;

Fig. 4 is a sectional view on line 4—4 in Fig. 3;

Fig. 5 is a sectional view on line 5—5 in Fig. 3;

Fig. 6 is a sectional view on line 6—6 on Fig. 3; and

Fig. 7 is a perspective view of certain parts of the invention.

In the drawing, which illustrates a preferred and practical embodiment of the invention, 10 indicates the cowl of the vehicle, 11 the chassis, and 12 the steering shaft which is journaled in bearing structures 13 arranged in a housing 14 attached to the cowl 10. On the lower end portion of the shaft 12 I provide a worm screw 15 which works in corresponding threads 16 of parts 17 and 18 of a split rider nut 19 which is slidably disposed within a passage 24 in a sleeve 20, the parts 17 and 18 being held against rotative movement by a screw 21 passed through aligned apertures 22 and 23 therein. This screw 21 may be adjusted to compensate for wear on the rider nut.

Below the sleeve 20 on a bracket 32 is arranged a packing gland 25 in which is slidably mounted a piston rod 26 which has its upper end threaded, as at 27, into a threaded aperture 28 on a flange 29 of the part 18. When, therefore, the steering shaft 12 is revolved in a clockwise direction, as seen from the top in Figs. 1, 2 and 3, the worm 15 will cooperate with the threads 16 of the rider nut 19 to retract the nut 19 upwardly on the steering shaft, the nut 19 sliding in the passage 24 and carrying with it the piston rod 26 and the piston 30 which is slidable in a housing 31 attached to the sleeve 20 by the bracket 32. This movement of the piston 30 is utilized in a manner now to be described.

On opposite sides of the piston 30 are fluid inlets 33 and 34 opening, respectively, into the areas 35 and 36, on opposite sides of the piston. The area 35 communicates by a conduit 37 with a cylinder 38 in which is arranged a piston 39 carried by a slidable rod 43, while the area 36 communicates by conduit 40 with a cylinder 41 in which is arranged a piston 42 also carried by the slidable rod 43. The cylinders 38 and 41 are secured to the chassis 10.

Extending from the chassis 10 is a boss 44 which is provided with an internally threaded aperture 45 to receive the threaded end 46 of a bolt or pin 47 on which an arm 48 is rockably mounted; the arm 48 having a ball 49 at its lower end which is receivable in a corresponding socket in the steering gear connecting rod 50. The upper end of the arm 48 is bifurcated to provide spaced arm portions 51 and 52 which embrace a substantially square housing 53 formed as a part of the rod 43. Mounted in this housing 53 is a block 54 which carries a pin 55 which has its ends mounted in openings 56 in the portions 51 and 52 of the arm 48 (Fig. 4).

Movement of the steering shaft 12 clockwise, looking down from the driver's seat, will cause the worm 15 to slide the rider nut 19 upwardly in its recess 24 in the sleeve 20, and since the end 27 of the piston rod 26 is attached to the flange 29 of the part 18 of the rider nut 19, the piston 30 will be lifted, forcing the fluid in area 36 through conduit 40 to the cylinder 41 and thus moving the rod 43 and pistons 42 and 39 to the left, as seen in Figs. 1 and 3. This movement of the rod 43 will cause the housing 53 on the rod to pivot the arm 48 at 47 and the lower end of the arm 48 will thus be moved to the right (Fig. 3), thus moving the steering gear connecting rod 50 which may be connected to the steering knuckle arms in any suitable manner. During this movement the block 54 rides down in the housing 53, and when the rod 43 is moved back to the right (Fig. 3), the block 54 moves up in the housing 53.

During the time that the fluid is being forced into the cylinder 41, the fluid in the cylinder 38 will be traveling by conduit 37 to the area 35, while movement of the shaft 12 to the left, looking down, will cause the worm 15 to act upon threads 16 to slide the split nut 19 downwardly and similarly move the rod 26 and the piston 30, thus forcing the fluid from the area 55 through the conduit 37 to the cylinder 38 and thus reversing the hereinbefore described movement of the rod 43, arm 48, and connecting rod 50.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

In fluid pressure operated automotive vehicle steering mechanisms, a rockable member pivotally mounted between its ends in the chassis of the vehicle and having pivotal connection at its lower end with the steering gear connecting rod of the vehicle, said rockable member including a bifurcated upper end providing a pair of spaced arms, a pair of spaced fluid pressure operated pistons, a slidable piston rod having said pistons attached to its ends, a substantially square housing formed on said piston rods between said pistons, a block slidably mounted in said housing, a pin carried by said block having its ends mounted in openings in said spaced arms, and means associated with the steering post of the vehicle for exerting fluid pressure on said pistons to operate said slidable piston rod.

In testimony whereof I affix my signature.

HERMAN L. LEWIS.